United States Patent [19]

Hopwood

[11] Patent Number: 4,915,464
[45] Date of Patent: Apr. 10, 1990

[54] REFLECTION HOLOGRAMS AND THE REPLICATION THEREOF

[75] Inventor: Antony I. Hopwood, Bollington, England

[73] Assignee: Ciba-Geigy AG, Basle, Switzerland

[21] Appl. No.: 233,400

[22] Filed: Aug. 18, 1988

[30] Foreign Application Priority Data

Aug. 27, 1987 [GB] United Kingdom ................ 8720189
Aug. 27, 1987 [GB] United Kingdom ................ 8720190
Aug. 27, 1987 [GB] United Kingdom ................ 8720191

[51] Int. Cl.$^4$ .............................................. G03H 1/20
[52] U.S. Cl. .................................. 350/3.69; 350/3.75; 350/3.78
[58] Field of Search ................. 350/3.66, 3.69, 3.75, 350/3.76, 3.78, 3.83, 3.84

[56] References Cited

U.S. PATENT DOCUMENTS

| 3,547,510 | 12/1970 | De Bitetto | 350/3.69 |
|---|---|---|---|
| 3,600,256 | 8/1971 | Tosaka et al. | |
| 3,625,584 | 12/1971 | St. John | |
| 4,364,627 | 12/1982 | Haines | 350/3.83 |
| 4,455,061 | 6/1984 | Case | 350/3.75 |
| 4,623,214 | 11/1986 | Bazargan | |
| 4,623,215 | 11/1986 | Bazargan | |

FOREIGN PATENT DOCUMENTS

| 87281 | 8/1983 | European Pat. Off. |
| 1901822 | 9/1969 | Fed. Rep. of Germany |
| 1278672 | 6/1972 | United Kingdom |
| 2150316 | 6/1985 | United Kingdom |

OTHER PUBLICATIONS

Soviet Journal of Quantum Electronics, 8, No. 7, 855–859, (1978).
Soviet Journal of Quantum Electronics, 8, No. 7, 809–819, (1978).

Primary Examiner—Bruce Y. Arnold
Assistant Examiner—Jay Patrick Ryan
Attorney, Agent, or Firm—Harry Falber

[57] ABSTRACT

Reflection holograms are described and are prepared from a transmission hologram. The reflection hologram is divided into a plurality of sequential parallel notional strips each of which is divided into bands, the bands and strips extending across the hologram from one side or end to the other and being parallel. Each band of a strip contains information derived from a respective notional strip into which the transmission hologram was divided during production of the reflection hologram. Thus each strip of the reflection hologram contains information derived from the whole of the transmission hologram. The reflection hologram is produced from the transmission hologram by a process in which each band of a notional strip of the reflection hologram is exposed in turn to a respective notional strip of the transmission hologram. The reflection hologram may be copied by placing it in contact with photosensitive holographic material and exposing the latter by notional strips with reference to respective notional strips in the reflection hologram. The exposure may be by way of exposing each strip in turn using a continuous laser beam or by way of exposing several strips at once using a pulsed laser beam and a holographic optical element.

17 Claims, 6 Drawing Sheets

REFLECTION HOLOGRAMS AND THE REPLICATION THEREOF

FIELD OF THE INVENTION

This invention relates to holograms for display purposes, and is particularly concerned with a reflection hologram which has been prepared from a transmission hologram, a method of preparing a reflection master hologram, and methods of preparing replicas of the reflection master hologram.

PRIOR ART

Various methods of replicating holograms have been proposed for example the method described in US-A-3600056 in which spatial filters are used in both the reference and the object beams. The article in the Soviet Journal of Quantum Electronics Volume 8 No. 7 (1978) pages 855–859 describes a method of preparing reflection holograms by interference copying of transmission holograms. It states in this article that the proposed method is based on the replacement of the material object by its (virtual or real) image reconstructed from a transmission hologram. In GB-A-1278672 there is described a method of producing a stereographic image by recording successively a plurality of images corresponding to different views of the object, each of the holographically recorded images occupying a separate element of the photographic plate. These elements form frames of photographic images and are made by successively indexing both the film and the photographic plate. Further in US-A-3625584 there is described a hologram which can be used in a three dimensional large screen movie show in which horizontal and vertical information components of an object scene are treated independently of each other.

BACKGROUND TO THE INVENTION

It is both costly and time consuming to produce a hologram for display purposes and often once a suitable hologram has been prepared it is required that tens, hundreds and even thousands of copies of this hologram be prepared from it. However, even though the original hologram be bright, copies of it, using the presently employed techniques for copying, yield copy holograms which often are not bright enough when reconstructed using diffuse light. When a large number of copies are required to be prepared from an original transmission hologram it is the common practice to prepare from the transmission hologram a high quality reflection master and then to prepare by contact copying using the reflection master the required number of copies. Thus if a large number of copy holograms are required it is worth expending considerable effort in producing a reflection master from which bright copies can be prepared which are capable of being reconstructed in diffuse light.

We have invented such a reflection master and also a method of preparing this master.

BRIEF DESCRIPTION OF THE INVENTION

According to one aspect of the present invention there is provided a reflection hologram which has been prepared from a transmission hologram, characterized in that the reflection hologram is divided into a plurality of sequential parallel notional strips extending from one side or end to the other, interference fringes present in said strips being substantially in the form of parts of concentric shells, and in that each such strip of the reflection hologram contains information derived from the whole of the transmission hologram, the reflection hologram being viewable through a viewing window defined by the position of the transmission hologram relative to the reflection hologram during the production of the latter.

Preferably each notional strip is divided into a plurality of notional bands parallel to the strip, each band containing information derived from a respective notional strip into which the transmission hologram was divided during the preparation of the reflection hologram, the number of notional bands in each notional strip of the reflection hologram being the same as the number of notional strips in the transmission hologram.

Thus if the transmission hologram relates to a human face a number of the notional strips in the reflection hologram prepared therefrom would relate to the eyes in the face but each of these strips contains information relating to the eyes obtained from the whole of the transmission hologram. Thus on reconstruction of the hologram the eyes are seen from all the angles permitted by the window size of the transmission hologram with both horizontal and vertical parallax.

According to another aspect of the present invention there is provided a method of forming a reflection master hologram from a transmission hologram characterized by the steps of (1) dividing the transmission hologram into a first number of parallel notional strips, (2) placing a reflection master parallel to the transmission hologram, (3) dividing the reflection master into a second number of notional strips parallel to each other and to the notional strips of the transmission hologram, (4) arranging a laser to provide an object scanning in turn each notional strip of the transmission hologram and to provide a reference beam, (5) arranging a shield or the like between the transmission hologram and the reflection master, the shield being formed with a slit or other beam-narrowing means parallel to said strips so that the object beam transmitted through the transmission hologram impinges upon a band of a notional strip of the reflection master, (6) directing the object beam through an optical system comprising a cylindrical lens and a slit or other beam-narrowing means both extending parallel to said strips and located on the opposite side of the reflection master from the transmission hologram, the lens being located at such a distance from the reflection master that a beam of light passing therethrough (in the absence of the beam-narrowing means) would be diverging from the focal point of the lens and of sufficient width to cover the whole of a notional strip in the reference master, the object beam and the reference beam being arranged to meet at an angle in the same band of a notional strip of the reflection master, (7) exposing said band by exposure to both said beams with reference to a scanned first notional strip of the transmission hologram, (8) altering the positions of both said beam-narrowing means and altering the direction of the object beam to scan the next adjacent notional strip of the transmission hologram, (9) exposing the next adjacent band of the same notional strip of the reflection master with reference to said next adjacent strip of the transmission hologram and repeating the process until the first notional strip of the reflection master has been exposed in bands with reference to each notional strip in the transmission hologram, the number of bands in a notional strip of the reflection master being equal to the number of notional strips in the transmission hologram, (10) altering the positions of the reflection master and the transmission hologram and repeating the exposure process until each notional strip of the refection master has been exposed bandwise with reference to each notional strip of the transmission hologram, and (11) processing the exposed reflection master to produce the reflection hologram.

As a result of this method, the exposed reflection master hologram comprises along its length a number of notional strips each of which comprises information from the whole of the transmission hologram recorded from different and suitable view points. When the reflection master is illuminated from a suitable angle and is viewed from a high angle the reconstructed hologram appears redder and when it is viewed from a low angle is appears greener. There is present in each notional strip of the reflection master a set of curved interference fringes which set helps to produce, when it is reconstructed, a bright hologram which appears sharper in diffuse light than prior art holograms.

This method of forming a reflection master produces a hologram wherein each strip contains fringes which are substantially concentric shells emanating from an axis parallel to the strip.

Thus the width of each notional strip is determined by focusing the reference beam on the reflection master being prepared using a laser reference beam which is converged to a focal point and thence diverged on to the reflection master, the width of the diverged beam being the width of each notional strip.

The effect of using multiple narrow beam exposures of each strip of the reflection master so that the object and reference beams meet at different angles at each exposure is to reduce the amount of information recorded in each strip and prevent fringe interpenetration.

The range of angles at which the reference beam meets the reflection master, controls the range of colors with which the image may finally be viewed. A larger range of angles produces a larger range of colors.

The range of colors which are visible on replay is also controlled by the effective aperture of the cylindrical lens, that is to say the aperture of the cylindrical lens caused by the movement of the scanning slit.

The size and position of the standard transmission hologram relative to the reflection master during exposure controls the range of angles and position from which the image reconstructed from the reflection master may be viewed.

REPLICATION

Because each notional strip on the reflection master has been made by focusing the reference beam on to each strip of the reflection master it is not possible to prepare by a simple contact copying process copies of the reflection master. We have found a method of preparing copies from such a reflection master in which the same principle of dividing the reflection master and the copy into a number of notional strips is employed.

Various method of preparing copies from reflection holographic masters have been published but these method can not be used to copy the type of reflection master described in this application. Examples of such prior art methods are shown in DE-OS 1901822, EP-A-87281 and in Hologram Copying a review by V. A. Vanin in the Soviet Journal of Quantum Electronics, Volume 8, No. 7, (1978.07) pages 809–819.

According to a further aspect of the present invention there is provided a method of preparing a copy of the reflection master hologram by placing photosensitive holographic material in contact with the hologram and exposing the resulting assembly to laser light, characterized in that a converging lens is located on the side of the assembly nearer to the photosensitive holographic material with its focal point on the other side of the assembly at the same distance from the reflection hologram as a converging lens used in its preparation so that a beam transmitted through said converging lens converges to said focal point and covers one notional strip in the reflection hologram, and in that each notional strip in the reflection hologram is exposed in turn to a laser beam directed through said lens and the photosensitive holographic material until all the notional strips in the reflection hologram have been so exposed, whereafter the photosensitive holographic material is processed to form the copy hologram.

The chosen position of the lens in front of the photosensitive holographic material being exposed ensures that the light reflected by the curved fringes in the reflection master returns substantially along its original path in order to replicate the fringes in the reflection master in the photosensitive material.

The exposure system can be tested to ensure that the laser beam is directed on to only one notional strip and does not overlap any other strip by the provision of a light sensitive meter which measures the light reflected back from the reflection master.

The greatest light reflected back will be when the light is directed on to one notional strip and does not overlap another strip.

Conveniently a continuous laser beam can be used in the latter method, the holographic material being masked except for the strip which covers the strip in the reflection master from which the laser light is to be reflected. Conveniently the top strip in the reflection master is exposed through the holographic material, the remainder of the holographic material being masked, a shutter then cuts out the light from the laser and the reflection master and holographic material are moved up one strip, the shutter is removed and the next to top strip and the holographic material in contact therewith are exposed. This process is continued until the whole of the reflection master and holographic material in contact therewith have been exposed to form in the holographic material a like number of strips having holographic fringes therein as were present in the reflection master.

According to yet a further aspect of the present invention there is provided a method of preparing a copy of the reflection master hologram by placing photosensitive holographic material in contact with the hologram and exposing the resulting assembly to laser light, characterized in that the photosensitive holographic material is placed in said assembly with a holographic optical element which comprises a number of notional strips which is a fraction of the number of notional strips in the reflection hologram, each notional strip in the holographic optical element containing light modulating fringes such that when the holographic optical element is placed in the assembly light entering each strip in the holographic optical element is converged to a focal point which is the same distance from the reflection hologram as a converging lens used in its preparation and covers one notional strip in the reflection hologram, and in that the assembly is subjected to a first exposure to laser light to expose a number of notional strips of the reflection hologram, moving the holographic optical element relative to the reflection hologram and subjecting the assembly to a subsequent exposure to laser light to expose further notional strips of the reflection hologram and repeating the process until all said notional strips have been exposed, the number of said exposures being integral and being the reciprocal of said fraction, whereafter the photosensitive material is processed to form the copy hologram.

In this latter method each strip in the holographic optical element acts as if it were a converging lens and during the exposure laser light is reflected from the fringes in the reflection master as if this light had come from the focused reference beam used in the production of the reflection master. This ensures that the light reflected by the curved fringes in the reflection master returns substantially along its original path to replicate the fringes in the reflection master in the copy material.

Preferably however in the exposure assembly there is present between the holographic optical element and the copying material a louvre sheet which is used to stop the copying material from being exposed by zero order light. Using such a louvre sheet prevents the whole of the copying film from being exposed in one exposure.

Instead of a louvre sheet, a dichromated gelatin hologram of narrow band width or a dichroic filter could be used selectively to reflect the zero order light.

In a second exposure the louvre sheet and the reflection master are moved by the distance of the vertical height of one strip in the reflection master. In this case the distance between the slats in the louvre sheet is that of two horizontal strips; if a louvre sheet having different slat distances be used then more exposures would be required.

It would be just possible to arrange the slat distances so that only one exposure would be required but some information would be lost using such an arrangement.

The greater the slat width, the greater the distance required between each slat. Thus louvres are employed so that the distance between each slat covers a whole number of notional strips, preferably two or three. If the distance between each slat covers two notional strips then the holographic optical element comprises half the number of strips which the reflection master comprises and two exposures are required to expose all the copy material. Similarly if the distance between each slat covers three notional strips then the holographic optical element comprises one third the number of strips which the reflection master comprises and three exposures are required to expose all the copy material.

This method is of particular use when it is desired to prepare copies from a reflection master using a high power pulsed laser.

THE DRAWINGS

In order to enable the invention to be more readily understood, reference will now be made to the accompanying drawings, which illustrate diagrammatically and by way of example some embodiments thereof, and in which.

DETAILED DESCRIPTION OF THE INVENTION

Figure 1:
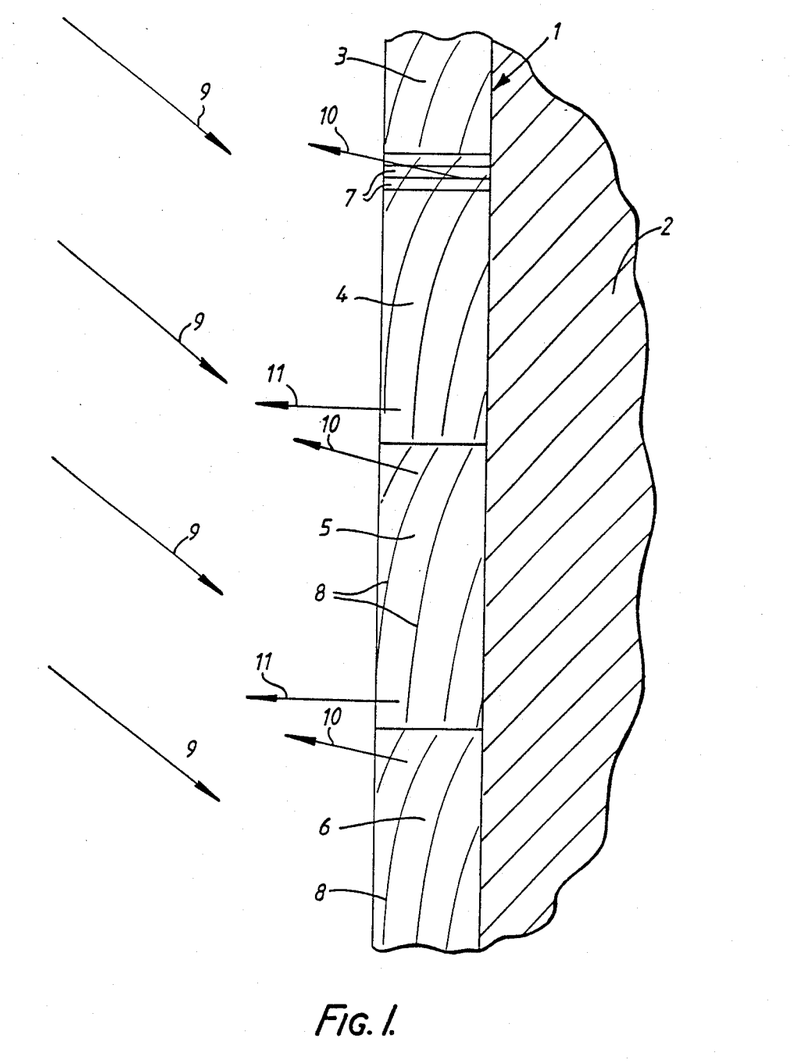
FIG. 1 is an enlarged sectional view of a detail of a reflection hologram.

Referring now to FIG. 1, there is shown a section through part of a master reflection hologram which comprises a photographic emulsion 1 coated on a base 2 of which only a part is shown since the base will normally have a thickness several times that of the emulsion. The hologram in its completed and exposed form may be considered to be divided, by the exposure during its production, into a number of notional strips 3, 4, 5 and 6 extending across the hologram from one side or end to the other. Likewise, each strip 3 to 6 is subdivided into a number of bands 7 of which only three bands of strip 4 are indicated in FIG. 1. As will be explained hereinafter, all the bands 7 of a strip contain information derived from all of a transmission hologram from which the master reflection hologram has been made.

There are indicated in FIG. 1, a series of curved interference fringes 8 produced by multiple exposures, these fringes, of course, not being visible but being indicated in FIG. 1 to show the effect of multiple exposures.

The hologram in FIG. 1 is shown being lit by a white light reference beam 9 and reflecting a red image beam 10 and a green image beam 11. The image beams reflected from the hologram interfere in conventional manner to produce an image (not shown).

The manner in which the master reflection hologram shown in FIG. 1 can be produced will now be illustrated with reference to FIGS. 2 to 4. The reflection hologram 12 is produced from a transmission hologram 14 which, itself, has been produced in conventional manner. The transmission hologram is notionally divided into a number of strips 15, 16, etc., each of which is illuminated in turn by a collimated object beam 17 from a laser (not shown). The number of strips 15, 16, etc., into which the transmission hologram 14 is notionally divided equals the number of bands 7 into which each notional strip of the reflection hologram is divided.

The reflection hologram 12, which originally is present in the form of a sheet or film of unexposed photosensitive material or a reflection master, is separated from the transmission hologram 14 by a shield 18 formed with a slit 19 which extends for the width of the reflection master 12 and parallel with the notional strips in both holograms.

The light which is transmitted through the transmission hologram 14 is shielded from the reflection master 12 save for a narrow band 20, which passes through the slit 19 to serve for exposing a band 7 of the reflection master, and which carries information relevant to the strip 16 of the transmission hologram being illuminated.

On the other side of the reflection master 12 to the hologram 14 is an optical system, comprising a cylindrical lens 21 also parallel with the slit 19 and notional strips, and a mask 22 formed with a slit 23. The mask 22 is illuminated by a reference beam 24 from the same laser (not shown) which produced the collimated beam 17.

The lens 21 is located behind the reflection master 12 at such a distance that, in the absence of the mask 22, the reference beam 24 would have passed through the focal point 25 of the lens and started to diverge to cover a notional strip 26 of the reflection master 12, the strip 26 corresponding to one of the strips 3 to 6 of the hologram shown in FIG. 1. However, in practice most of the reference beam 24 is masked so that only a very narrow beam reaches the reflection master 12. The slits 19 and 23 are located such that the same band 7 of the reflection master 12 is illuminated at the same time (c.f. FIG. 4).

Figure 2:
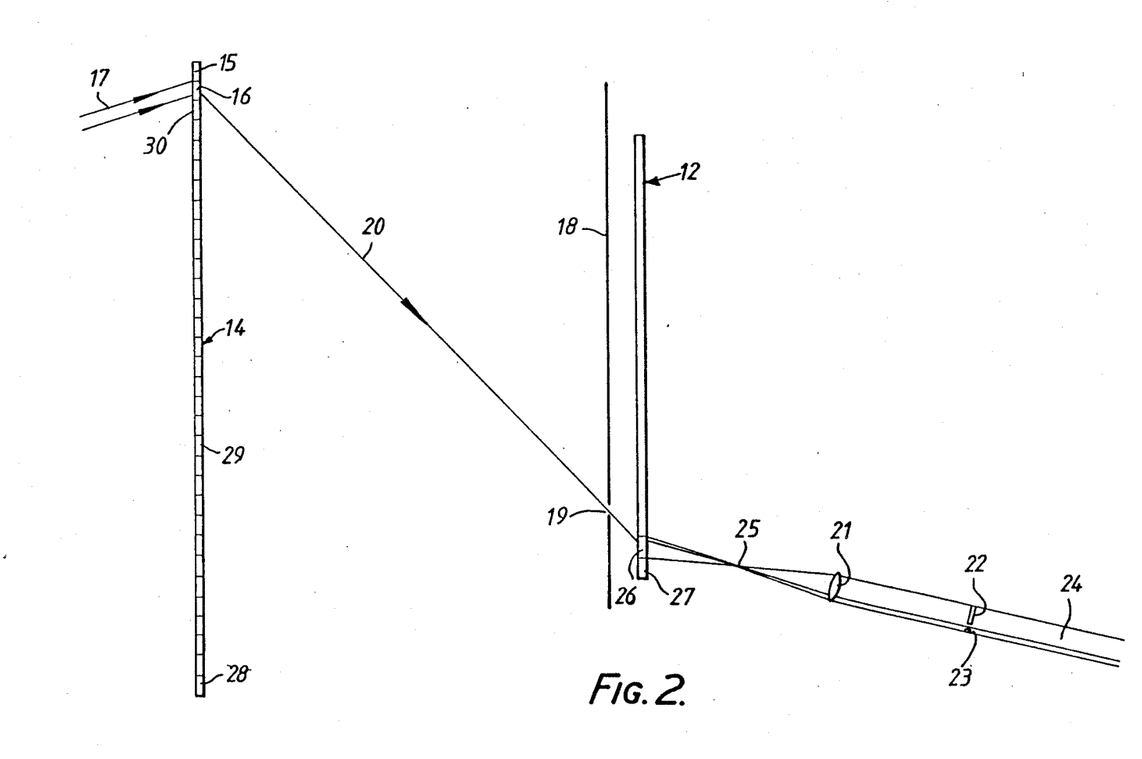
FIG. 2 illustrates a step in the production of reflection hologram of FIG. 1 from a transmission hologram and the optical system used.

The reflection master 12 is divided by exposure into a number of notional strips defined by the divergence of the reference beam and FIG. 2 shows one such strip 27 already exposed and the next adjacent strip 26 in the process of being exposed. FIG. 2 shows the strip 26 near the commencement of the exposure operation and FIG. 3 shows the strip 26 at the end of the exposure operation with a strip 28 of the transmission hologram illuminated by the collimated laser beam 17. FIG. 4 shows, to an enlarged scale, an intermediate position in which a band 7 near the center of the strip 26 is receiving, for exposure purposes, light transmitted through an intermediate notional strip 29 (FIG. 2) of the transmission hologram 14 and light transmitted through the lens 21, the mask 22 having been positioned so that the light transmitted through the slit serves to illuminate the same band 7 that is being illuminated by the beam 20 passing through the slit 19.

It will be appreciated that in order to produce the completed master reflection hologram a large number of exposures will be required. Thus, if for example the reflection hologram is divided into 100 notional strips 3,4,5 and 6 in FIG. 1 or 26 and 27 in FIGS. 2 to 4, and if the transmission hologram is divided into 50 notional strips 15,16,28 and 29, then there will be 50 bands 7 in each of the notional strips of the reflection hologram and 5000 exposures are required to provide a fully exposed reflection hologram 12.

The apparatus required to accomplish these exposures will include means to enable the laser beam 17 to scan the notional strips of the transmission hologram 14 in sequence, starting at one side or end and finishing at the opposite side or end, means to move the mask 18 and means to move the mask 22 correspondingly so that for each position of the laser beam 17 as it scans a notional strip of the transmission hologram, the slits 19 and 23 are positioned to illuminate an appropriate band of the notional strip of the reflection master 12. In the example given above the masks 18 and 22 need to be moved mutatis mutandis to provide 50 different positions of the slits 19 and 23.

Furthermore, means are required to advance the reflection master and the transmission hologram by the distance of one notional strip after each notional strip has received its full exposure.

In the operation of producing the reflection hologram, the exposure of a notional strip of the reflection master can commence as shown in FIG. 2. The strip 16 of the transmission hologram 14 is being scanned and the shield 18 is positioned so that the uppermost (relative to FIG. 2) band 7 of the notional strip 26 is exposed by the beam 20.

This same uppermost band of the notional strip 26 is being exposed by the reference beam 24 which has passed through the slit 23 and the lens 21. After this exposure, which can last one hundredth of a second, the collimated beam 17 is altered to scan the next adjacent lower strip 30 of the transmission hologram.

However before this strip 30 is scanned, the position of the slit 19 in the shield 18 is adjusted very slightly so that the next to the top band 7 of the strip 26 can be exposed and the position of the slit 23 in the path of the reference beam is adjusted slightly. The second exposure then takes place. After 48 such exposures with the slits and collimated beam being altered mutatis mutandis, the position is reached as shown in FIG. 3 where the lowermost band 7 of the strip 26 is being exposed to the beam 20 transmitted through the lowermost notional strip 28 of the transmission hologram. Then the reflection master 12 and the transmission hologram 14 are both moved down (relative to FIGS. 2 and 3) so that the next adjacent notional strip 31 is behind the slit 19.

Fifty more such exposures are carried out on this strip, and the reflection master and the transmission hologram are then moved down until the next adjacent strip is behind the slit 19 and this procedure is carried on until all the reflection master has been exposed.

The amount that the reflection master is moved after each strip has been fully exposed and the width of the reflection master that would be covered by a diverging beam transmitted through the lens 21 in the absence of the mask 22 determine the width of each strip and these are controlled to ensure that all the reflection master has been exposed. The movement of the shield 18 between each exposure must be such that the whole width of each strip is exposed during the exposure cycle of each strip.

Thus for each exposure, the width of the object beam 20 and the reference beams 24 are controlled by slits and as a result only light incident at controlled angles interferes in the photosensitive material to produce the interference fringes, thus preventing interpenetration of the fringes.

It is preferable that the notional strips in the exposed reflection master should touch each other or should possibly slightly overlap so that the stripe-like structure is minimized on replay. In practice many more than 100 strips may be required.

During the preparation of the reflection master the effective numerical aperture of the cylinder lens 21, that is the aperture of the cylindrical lens caused by the movement of the scanning slit, controls the range of colors on replay.

The position and size of the transmission hologram, relative to the reflection master during the exposures, control the range of angles from which the hologram may be viewed on replay, and define the window through which the image produced by the reflection hologram can be viewed.

The reflection master hologram prepared by the present invention can be copied by contact printing on to holographic material using either a continuous wave laser or a pulsed laser.

Figure 5:
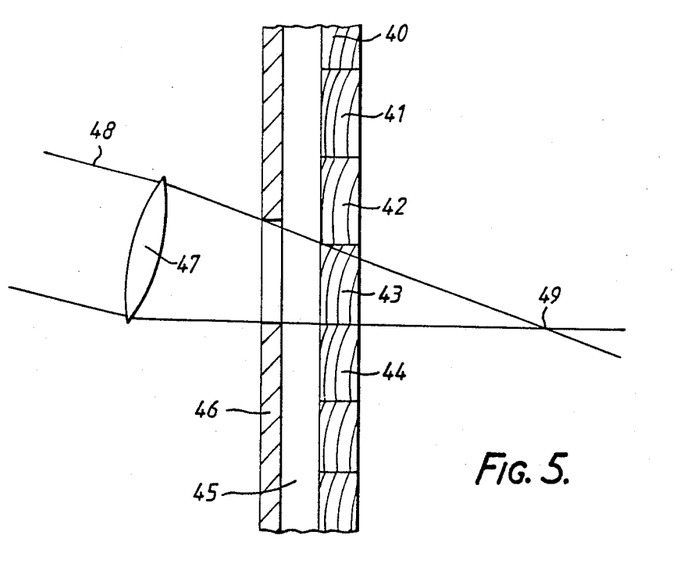
FIG. 5 illustrates a step in copying the reflection hologram of FIG. 1 using a continuous wave laser.

The optical system required to copy the reflection master produced by the method of the invention using a continuous laser is shown in FIG. 5. In this figure, a reflection master hologram 40 has a series of notional strips 41, 42, 43, 44, etc., which have been prepared as just described. In contact with this hologram is a transparent sheet of photosensitive holographic material 45 and the latter is masked by a mask 46. On one side of this assembly is a cylindrical lens 47. This lens is placed so that a beam 48 of laser light passed therethrough would converge so as to cover one notional strip, in this case the strip 43, of the reflection master hologram and the mask 46 has a slit of sufficient width to permit one notional strip, i.e. the strip 43, to be covered.

Figure 3:
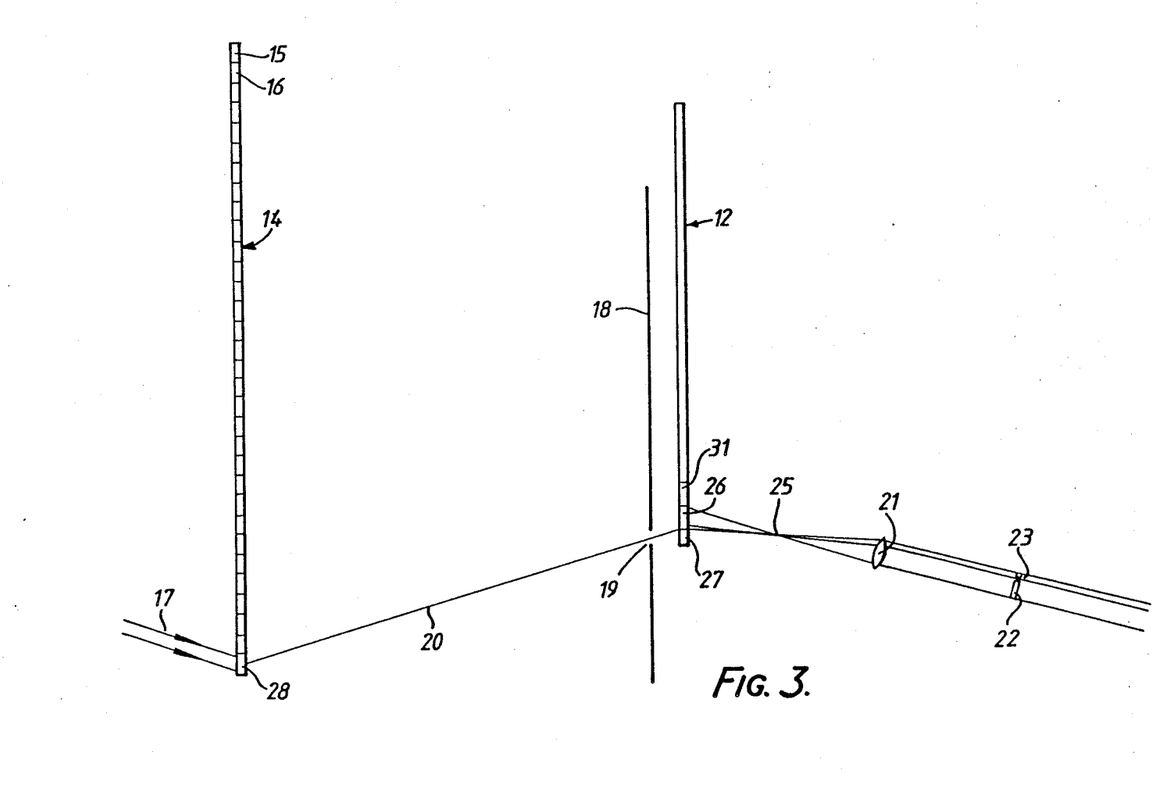
FIG. 3 is a view similar to FIG. 2 illustrating another step.
Figure 4:
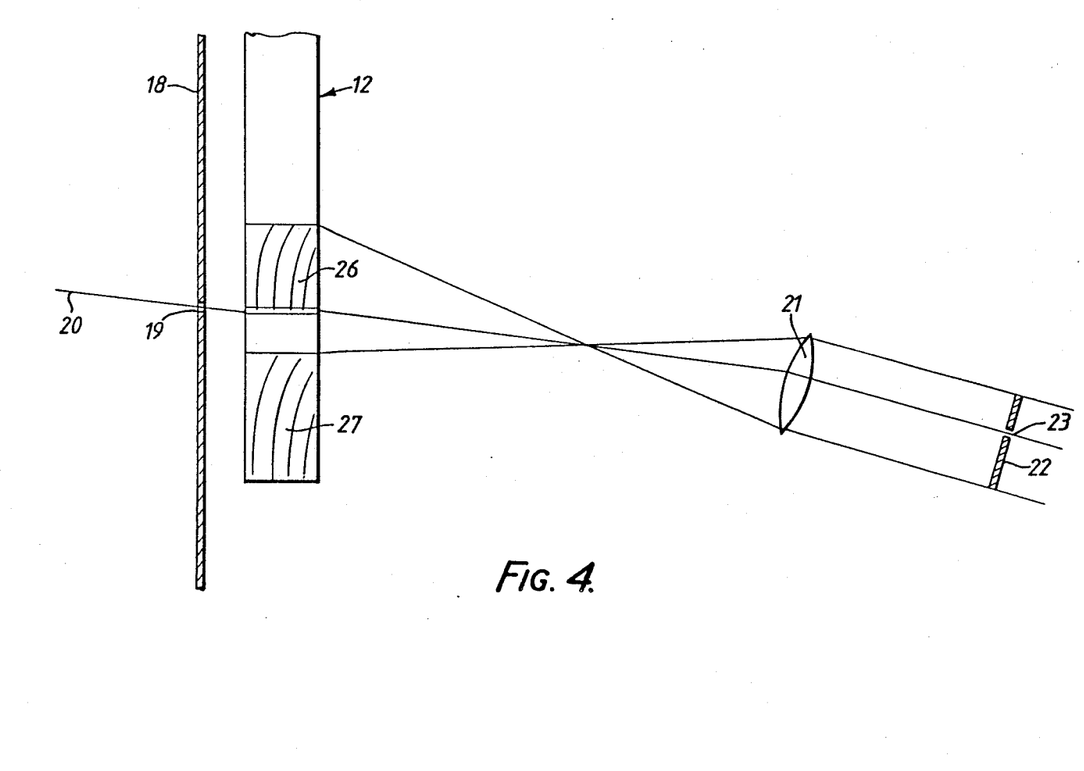
FIG. 4 is an enlarged detail of a step intermediate the steps shown in FIGS. 2 and 3.

The lens is located so that its focal point 49 on the other side of the reflection master is the same distance from the reflection master as the focal point 25 of the lens shown in FIGS. 2 and 3. This provides a range of reference angles which matches the fringes in the reflection master as long as the cylindrical lens has the same effective numerical aperture as the lens used in the exposure of the reflection master.

The uppermost (with reference to FIG. 5) notional strip in the reflection master together with the photosensitive holographic material 45 in contact therewith is exposed, the remainder of the material 45 being masked by the mask 46. The beam 48 is then interrupted by a shutter (not shown) and the mask 45 is moved to correspond to the next lower notional strip which is then exposed in the same manner. Each strip is thereafter exposed in turn until the whole of the reflection master has been reproduced in the holographic material 45. In each case a standing wave pattern concentric with the original fringes in the strip being exposed is produced in the holographic material 45. Thus using the reflection master as just described one hundred exposures would be required.

After all the photosensitive holographic material 45 has been exposed it is processed to produce a hologram which is a copy of the reflection master having in this case 100 notional strips each having therein a series of curved fringes as shown in FIG. 1. As with the reflection master a very bright hologram is produced which can be reconstructed using diffuse white light. When the reconstructed hologram is viewed from a high angle the image appears redder and when viewed from a low angle it appears greener.

However, when it is required to produce copies using a pulsed laser from the reflection master hologram prepared by the present invention, a different method must be used as a pulsed laser requires several seconds to recharge after each exposure and the length of time to perform 100 exposures could be several minutes. In this case one method which can be employed is to prepare a holographic optical element which serves to modulate the collimated reference beam used in the copying process in which case the whole holograph can be copied in one, two, three or other whole number of exposures A holographic optical element is prepared which contains a fraction of the number of notional strips as the reflection master and during the copying exposure this is placed in contact with the photosensitive copy holographic material which is in contact with the reflection master. However preferably a louvre sheet is interposed between the holographic optical element and the copy holographic material during the copying exposure to prevent zero order light from exposing the copy material.

Instead of a louvre sheet, a dichromated gelatin hologram of narrow band width or a dichroic filter could be used selectively to reflect the zero order light.

Figure 6:
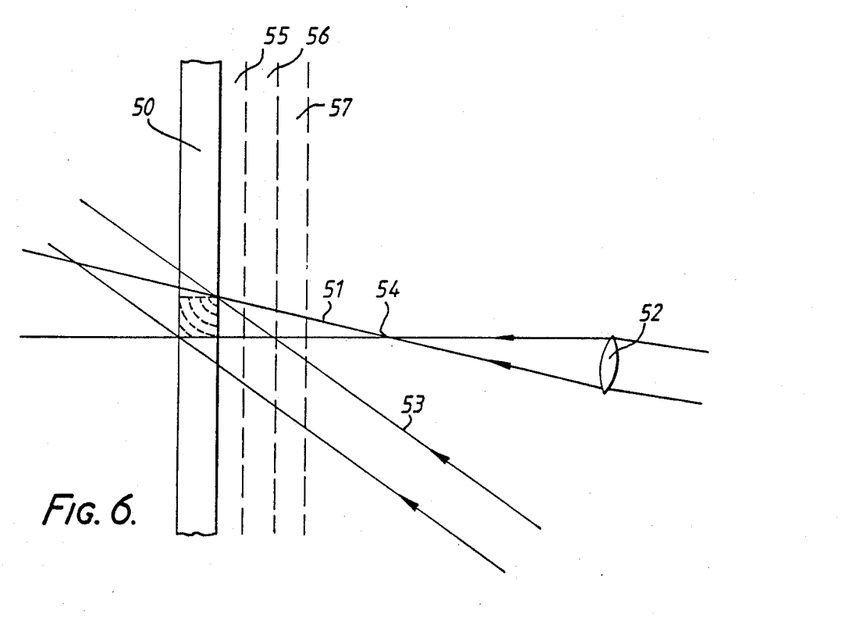
FIG. 6 illustrates a step in the production of a holographic optical element.
Figure 7:
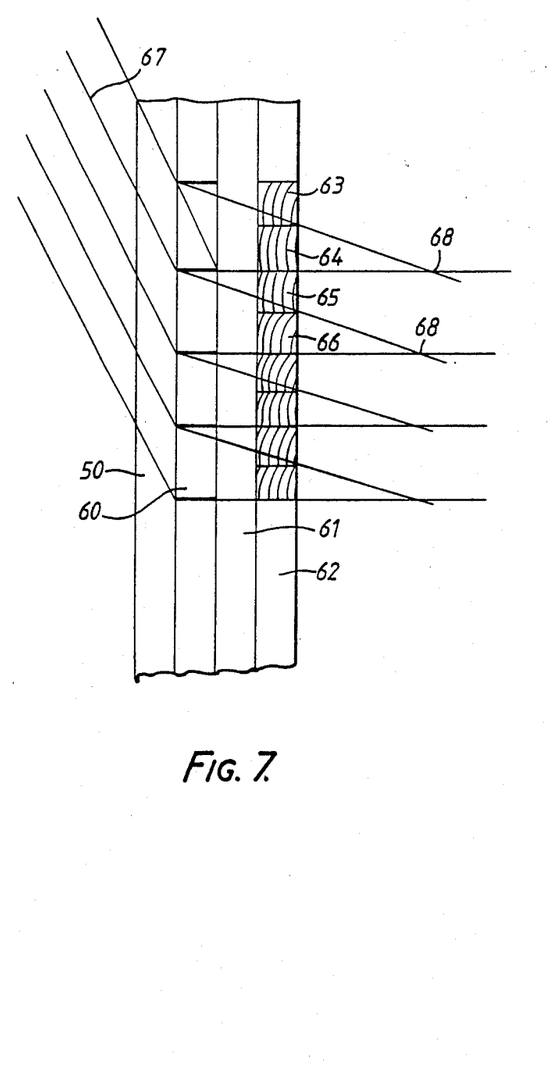
FIG. 7 illustrates a step in copying the hologram reflection of FIG. 1 using a pulsed laser.

Referring now to FIGS. 6 and 7, there is shown how such a holographic optical element is prepared and how it is used to copy a reflection master on to a sheet of photosensitive holographic material.

Referring first to FIG. 6 there is shown how the light-modifying holographic optical element (HOE) is prepared. being exposed by an object beam 51, which is focused on a notional strip thereof from a converging lens 52, the same as the lens 21 as used in FIGS. 2 and 3, and by a reference beam 53 from the same laser. The focal point 54 of the converging lens is spaced from the photosensitive material 50 by a distance which is greater than the combined thicknesses of the louvre sheet 55 the copy material 56 and the reflection master 57 the thicknesses of which are indicated by broken lines in FIG. 6, and this distance is such that the distance between the focal point 54 and the position 57 for the reflection master is effectively the same as the distance between the reflection master and the focal point 25 of the lens 21 in FIGS. 2 and 3. Due to this arrangement, the light diverging from the focal point 54 would cover the width of one notional strip in the reflection hologram but diverges to cover in photosensitive material being exposed, a width equal to twice the width of a notional strip in the reflection hologram.

Half the number of exposures of the material 50 are made as there are strips on the reflection master and thus in the material as just described fifty exposures only are required, the photosensitive material being moved after one exposure a distance equal to twice the width of a notional strip until the whole of the material 50 has been exposed.

In this case the holographic optical element contained half the number of notional strips as the reflection hologram. However, the holographic optical element could contain a third or a quarter or other fraction of the number of strips as the reflection hologram but in such a case a third or a quarter or other fraction of the number of exposures would be required to produce the holographic optical element.

The material is then processed in conventional manner to yield a light-modifying holographic optical element. Use is made of this holographic optical element in copying the reflection hologram using a pulsed laser.

Referring now to FIG. 7, there is shown part of an assembly which is being exposed to the light from a pulsed laser for the purpose of copying the reflection hologram prepared by the present invention.

This assembly comprises the holographic optical element 50 as just prepared, a louvre sheet 60, the copy holographic material 61 and the reflection master 62 divided into notional strips 63, 64, 65, 66, etc.

During the first exposure a reference beam 67 is directed on to the holographic optical element 50 which covers the whole of the copy material 61 and the reflection master 62. The holographic optical element directs the reference beam 67 through the assembly as if it were converging on the optical focus point positions 68 of the cylindrical lens which was used to prepare the holographic optical element. Thus, as shown in FIG. 7, the reference beam 67 striking an area of the holographic optical element having a width equal to that of the width of two notional strips in the reflection master is converged to cover one notional strip in the reflection master 62 so that every other strip 64, 66, etc., is lit.

Light is reflected back along the same path by the fringes in the reflection master. This causes a copy of these curved interference fringes to be formed in the copy material 61.

As can be seen from FIG. 7 the presence of the louvre sheet prevents those parts of the reference beam which have not been deviated by the holographic optical element from falling on to the copy material or the reflection master. Thus in this case undeviated light from beam 67 is prevented by a louvre slat from reaching strips 63 and 65 via material 61.

After the first exposure, both the holographic optical element and the louvre are moved by the distance of one horizontal strip on the reflection master and another exposure is carried out so as completely to expose the copy material to ensure that all the information in the horizontal strips of the reflection master has been copied on to the copy material. Then the copy material 61 is then processed to yield a copy hologram which is a replica of the reflection master hologram 62.

Again if the holographic element were to contain a third or a quarter or other fraction of the number of notional strips in the reflection hologram, then three, four or other integral number of exposures would be required to expose the copy material completely, in each case the number of exposures being integral and the reciprocal of the said fraction.

WHAT I CLAIM IS:

1. A reflection hologram which has been prepared from a transmission hologram, wherein the reflection hologram is divided into a plurality of sequential parallel notional strips extending from one side or end to the other, interference fringes present in said strips being substantially in the form of parts of concentric shells, and such strip of the reflection hologram containing information derived from the whole of the transmission hologram, the reflection hologram being viewable through a viewing window defined by the position of the transmission hologram relative to the reflection hologram during the production of the reflection hologram.

2. The reflection hologram of claim 1, wherein each notional strip is divided into a plurality of notional bands parallel to the strip, each band containing information derived from a respective notional strip into which the transmission hologram was divided during the preparation of the reflection hologram, the number of notional bands in each notional strip of the reflection hologram being the same as the number of notional strips in the transmission hologram.

3. A method of forming a reflection master hologram from a transmission hologram comprising by the steps of
   (1) dividing the transmission hologram into a first number of parallel notional strips,
   (2) placing a reflection master parallel to the transmission hologram,
   (3) dividing the reflection master into a second number of notional strips parallel to each other and to the notional strips of the transmission hologram,
   (4) arranging a laser to provide an object beam for scanning in turn each notional strip of the transmission hologram and to provide a reference beam,
   (5) arranging a shield or the like between the transmission hologram and the reflection master, the shield being formed with a slit or other beam-narrowing means parallel to said strips so that the object beam transmitted through the transmission hologram impinges upon a band of a notional strip of the reflection master,
   (6) directing the object beam through an optical system comprising a cylindrical lens and a slit or other beam-narrowing means both extending parallel to said strips and located on the opposite side of the reflection master from the transmission hologram, the lens being located at such a distance from the reflection master that a beam of light passing therethrough (in the absence of the beam-narrowing means) would be diverging from the focal point of the lens and of sufficient width to cover the whole of a notional strip in the reference master, the object beam and the reference beam being arranged to meet at an angle in the same band of a notional trip of the reflection master,
   (7) exposing said band by exposure to both said beams with reference to a scanned first notional strip of the transmission hologram,
   (8) altering the positions of both said beam-narrowing means and altering the direction of the object beam to scan the next adjacent notional strip of the transmission hologram,
   (9) exposing the next adjacent band of the same notional strip of the reflection master with reference to said next adjacent strip of the transmission hologram and repeating the process until the first notional strip of the reflection master has been exposed in bands with reference to each notional strip in the transmission hologram, the number of bands in a notional strip of the reflection master being equal to the number of notional strips in the transmission hologram,
   (10) altering the positions of the reflection master and the transmission hologram and repeating the exposure process until each notional strip of the reflection master has been exposed bandwise with reference to each notional strip of the transmission hologram, and
   (11) processing the exposed reflection master to produce the reflection hologram.

4. A reflection hologram formed by the method claimed in claim 3.

5. A method of preparing a copy of a reflection master hologram, which is divided into a plurality of sequential parallel notional strips extending from one side or end to the other, interference fringes present in said strips being substantially in the form of parts of concentric shells, and such strips of the reflection hologram containing information derived from the whole of the transmission hologram, comprising the steps of placing photosensitive holographic material in contact with the hologram, locating a converging lens on the side of the assembly nearer to the photosensitive holographic material with its focal point on the other side of the assembly at the same distance from the reflection hologram as a converging lens used in its preparation so that a beam transmitted through said converging lens converges to said focal point and covers one notational strip in the reflection hologram, exposing each notational strip in the reflection hologram in turn to a laser beam directed through said lens and the photosensitive holographic material until all the notational strips in the reflection hologram have been so exposed, and processing the photosensitive holographic material to form the copy hologram.

6. The method of claim 5, wherein the laser beam is a continuous laser beam, and masking means is provided for masking the photosensitive holographic material other than that in contact with notional strip being exposed.

7. A copy hologram produced by the method claimed in claim 6.

8. A copy hologram produced by the method claimed in claim 5.

9. A method of preparing a copy of a reflection master hologram, which is divided into a plurality of sequential parallel notional strips extending from one side or end to the other, interference fringes present in said strips being substantially in the form of parts of concentric shells, and such strips of the reflection hologram containing information derived from the whole of the transmission hologram, comprising the steeps of placing photosensitive holographic material in contact with the hologram, placing in contact with the photosensitive holographic material a holographic optical element which comprises a number of notional strips which is a fraction of the number of notional strips in the reflection hologram, each notional strip in the holographic optical element containing light modulating fringes such that when the holographic optical element is placed in the assembly light entering each strip in the holographic optical element is converged to a focal point which is the same distance from the reflection hologram as a converging lens used in its preparation and covers one notional strip in the reflection hologram, subjecting the resulting assembly to a first exposure to laser light to expose a number of notional strips of the reflection hologram moving the holographic optical element relative to the reflection hologram, subjecting the assembly to a subsequent exposure to laser light to expose further notional strips of the reflection hologram, repeating the process until all said notional strips have been exposed, the number of said exposures being integral and being the reciprocal of said fraction, and processing the photosensitive material to form the copy hologram.

10. The method of claim 9, wherein a louvre sheet is interposed in said assembly between the holographic optical element and the photosensitive holographic material in order selectively to reflect zero order light.

11. The method of claim 10, wherein a pulsed laser is used to expose the assembly.

12. The method of claim 9, wherein a dichromated gelatin hologram of narrow band width is interposed in said assembly between the holographic optical element and the photosensitive holographic material in order selectively to reflect zero order light.

13. The method of claim 9, wherein a dichroic filter is interposed in said assembly between the holographic optical element and the photosensitive holographic material in or selectively to reflect zero order light.

14. The method of claimed in claim 9 or 8, wherein each notional strip in the holographic optical element is as wide as two notional strips in the reflection hologram.

15. The method of claim 9, wherein a pulsed laser is used to expose the assembly.

16. A copy hologram produced by the method claimed in claim 9.

17. The method of claim 9, wherein each notional strip in the holographic optical element is as wide as two notional strips in the reflection hologram.

* * * * *